(12) United States Patent
Yamada et al.

(10) Patent No.: US 7,174,333 B2
(45) Date of Patent: Feb. 6, 2007

(54) DATA OBTAINING METHOD AND TERMINALS

(75) Inventors: Kazuhiro Yamada, Yokohama (JP); Masaaki Yamamoto, Yokohama (JP); Yoshiaki Hiramatsu, Yokosuka (JP); Kyoko Inoue, Tokyo (JP); Dai Kamiya, Ichikawa (JP); Eriko Ooseki, Yokosuka (JP); Motoki Tokuda, Yokosuka (JP); Tatsuro Ooi, Yokohama (JP); Yutaka Sumi, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 271 days.

(21) Appl. No.: 10/204,363

(22) PCT Filed: Nov. 21, 2001

(86) PCT No.: PCT/JP01/10170

§ 371 (c)(1),
(2), (4) Date: Aug. 16, 2002

(87) PCT Pub. No.: WO02/42918

PCT Pub. Date: May 30, 2002

(65) Prior Publication Data

US 2003/0097373 A1 May 22, 2003

(30) Foreign Application Priority Data

Nov. 24, 2000 (JP) ............................. 2000-358046

(51) Int. Cl.
G06F 17/30 (2006.01)

(52) U.S. Cl. .................... 707/9; 707/10; 707/104.1

(58) Field of Classification Search ................. 707/9, 707/10, 104.1, 201; 709/203, 229; 713/200, 713/201
See application file for complete search history.

(56) References Cited

U.S. PATENT DOCUMENTS 5,477,542 A   12/1995   Takahara et al. ............ 370/389

(Continued)

FOREIGN PATENT DOCUMENTS

JP        2000-285048        10/2000

(Continued)

OTHER PUBLICATIONS

Korba, L., "Towards Secure Agent Distribution and Communication" *Proceedings of the 32nd Annual Hawaii International Conference on System Sciences*, 1999, 10 Pages.

(Continued)

*Primary Examiner*—Jeffrey Gaffin
*Assistant Examiner*—Yicun Wu
(74) *Attorney, Agent, or Firm*—Brinks Hofer Gilson & Lione (57) ABSTRACT

At a terminal where communication can take place via a network, ADF in which property information on data is stored is received, and based upon the communication systems (ordinary/SSL) which were used for receiving this ADF and the communication system which is used for receiving JAR in which the entity of the above mentioned data is stored, whether a communication pattern is allowable determined. JAR is received if the communication pattern is allowable, and JAR is not received if the communication pattern is not allowable for security reasons. In other words, data is obtained only when the communication pattern is allowable.

22 Claims, 7 Drawing Sheets

U.S. PATENT DOCUMENTS

| | | | |
|---|---|---|---|
| 5,949,978 A | 9/1999 | Kondo et al. | 709/231 |
| 6,523,067 B2 * | 2/2003 | Mi et al. | 709/229 |
| 6,606,708 B1 * | 8/2003 | Shifrin et al. | 713/201 |
| 6,766,353 B1 * | 7/2004 | Lin et al. | 709/203 |
| 6,772,159 B1 * | 8/2004 | Blount et al. | 707/10 |
| 6,810,405 B1 * | 10/2004 | LaRue et al. | 707/201 |
| 6,823,461 B2 * | 11/2004 | Narayanan et al. | 713/200 |

FOREIGN PATENT DOCUMENTS

| | | |
|---|---|---|
| JP | 2000-305849 | 11/2000 |

OTHER PUBLICATIONS

Heuer, J. et al., "Adaptive Multimedia Messaging based on MPEG-7—The $M^3$- Box", *Proceedings 2nd Int'l Symposium on Mobile Multimedia Systems & Applications*, Nov. 10, 2000, XP-002201575, 8 pages.

Mohan, R. et al., "Adapting Multimedia Internet Content for Universal Access", *IEEE Transactions on Multimedia, IEEE Service Center*, vol. 1, No. 1, Mar. 1999, XP002159629, pp. 104-114.

Czerwinski, S. E. et al., "An Architecture for a Secure Service Discovery Service", *MOBICOM '99, Proceedings of the 5th Annual ACM/IEEE International Conference on Mobile Computing and Networking*, vol.conf.5, Aug. 15, 1999, XP000896069, pp. 24-35.

Gong, L., "New Security Architectural Directions for Java (Extended Abstract)", *COMPCON '97, Proceedings*, Feb. 23, 1997, XP010219517, pp. 97-102.

\* cited by examiner

| COMMUNICATION PATTERN | STEPS | | |
|---|---|---|---|
| | A (OBTAIN A PAGE) | B (OBTAIN ADF) | C (OBTAIN JAR) |
| P1 | ORDINARY | ORDINARY | SSL |
| P2 | SSL | ORDINARY | SSL |
| P3 | ORDINARY | SSL | ORDINARY |
| P4 | SSL | SSL | ORDINARY |
| P5 | ORDINARY | SSL | SSL |
| P6 | SSL | SSL | SSL |
| P7 | ORDINARY | ORDINARY | ORDINARY |
| P8 | SSL | ORDINARY | ORDINARY |

FIG. 3

| COMMUNI-CATION PATTERN | CONNECTING MODE (A→B) | DISPLAYED MESSAGE WHEN SHIFTING BEGINS (A→B) | CONNECTING MODE (B→C) | DISPLAYED MESSAGE WHEN SHIFTING BEGINS (B→C) |
|---|---|---|---|---|
| P1 | — | "BEING OBTAINED" | — | "SSL COMMUNICATION BEGINS (BEING AUTHENTICATED)" |
| P2 | — | "SSL PAGE TERMINATES" | — | "SSL COMMUNICATION BEGINS (BEING AUTHENTICATED)" |
| P3 | — | "SSL COMMUNICATION BEGINS (BEING AUTHENTICATED)" | — | "CAN NOT BE PROCESSED" |
| P4 | NON-KEEP-ALIVE | "SSL COMMUNICATION BEGINS" | — | "CAN NOT BE PROCESSED" |
| P4 | KEEP-ALIVE | NO DISPLAY | — | "CAN NOT BE PROCESSED" |
| P5 | — | "SSL COMMUNICATION BEGINS (BEING AUTHENTICATED)" | NON-KEEP-ALIVE | "SSL COMMUNICATION BEGINS" |
| P5 | — | "SSL COMMUNICATION BEGINS (BEING AUTHENTICATED)" | KEEP-ALIVE | NO DISPLAY |
| P6 | NON-KEEP-ALIVE | "SSL COMMUNICATION BEGINS" | NON-KEEP-ALIVE | "SSL COMMUNICATION BEGINS" |
| P6 | KEEP-ALIVE | NO DISPLAY | KEEP-ALIVE | NO DISPLAY |
| P7 | — | "BEING OBTAINED" | — | "BEING OBTAINED" |
| P8 | — | "SSL PAGE TERMINATES" | — | "BEING OBTAINED" |

| SHIFTING PATTERN | | CONNECTING MODE (A→B) | PROCESS (A→B) |
|---|---|---|---|
| STEP A | STEP B | | |
| ORDINARY | ORDINARY | — | ORDINARY COMMUNICATION CONTINUES |
| ORDINARY | SSL | — | NEW SSL COMMUNICATION BEGINS |
| SSL | ORDINARY | — | SSL COMMUNICATION ENDS |
| SSL | SSL | NON-KEEP-ALIVE | SSL COMMUNICATION BEGINS |
| SSL | SSL | KEEP-ALIVE | SSL COMMUNICATION CONTINUES |

PT2

| SHIFTING PATTERN | | CONNECTING MODE (B→C) | PROCESS (B→C) |
|---|---|---|---|
| STEP B | STEP C | | |
| ORDINARY | ORDINARY | — | ORDINARY COMMUNICATION CONTINUES |
| ORDINARY | SSL | — | NEW SSL COMMUNICATION BEGINS |
| SSL | ORDINARY | — | CAN NOT BE PROCESSED |
| SSL | SSL | NON-KEEP-ALIVE | SSL COMMUNICATION BEGINS |
| SSL | SSL | KEEP-ALIVE | SSL COMMUNICATION CONTINUES |

FIG. 7

DATA OBTAINING METHOD AND TERMINALS

TECHNICAL FIELD

The present invention relates to a data obtaining method for obtaining data via a network, and terminals for obtaining data by means of this method.

BACKGROUND ART

Due to recent development of communication networks, obtaining data via networks such as the Internet (downloading) is widely performed. The data obtained via networks such as the Internet is usually stored in fixed memory such as a hard disk. The data stored in fixed memory, even after CPU (Central Processing Unit) and RAM (Random Access Memory) are initialized by restarting the terminal by turning the power of the terminal off once then turning it on again, or by resetting the terminal, can be accessed again by reading out the data from the fixed memory in which data is stored.

Also, when data is obtained via networks such as the Internet, the obtained data may even be stored in temporary memory such as RAM. An example of data in this manner is Java applet. Java applet is a program which is produced by utilizing Java (Java application). Java applet is obtained via networks such as the Internet and is stored in temporary memory of the terminal. Java applet obtained in the terminal is used via the browser for viewing Web pages written in HTML (Hyper Text Markup Language) and Java Virtual Machine. As described above, when the terminal is restarted, the temporary memory of RAM is initialized, and the data stored in the temporary memory is eliminated. When data obtained via networks such as the Internet is stored in temporary memory, it can not be used again unless the data is obtained again via networks such as the Internet after the terminal is restarted.

There are a number of Java applications, which, unlike Java applet, are stored in fixed memory after being obtained from networks such as the Internet, and do not need to be obtained again from networks such as the Internet even after the terminal is restarted. There are also Java applications which are stored in fixed memory of the terminal, and do not need to be obtained from a network. However, for the purpose of describing the present invention, "Java application" will hereinafter refer to a Java application which is obtained from a network since obtaining data from a network is the presupposition.

It is to be noted that whether the data obtained from networks such as the Internet is stored in fixed memory or in temporary memory, it is usually received from the network such as the Internet as a file. For instance, when a Java application consisting of a single file is obtained from a Web server by HTTP (Hyper Text Transfer Protocol), it takes place in one sequence, in other words, connecting to the Web server, requesting information, receiving the response and disconnecting from the Web server. In this case, as the user requests a Java application by operating the terminal, downloading starts immediately, and the connection between the Web server and the terminal is maintained until the download is complete. A message is displayed in the terminal indicating that a file is being downloaded.

In this method of obtaining data, the terminal user can not know property information such as the file size of the Java application before beginning to download it; hence, the terminal user can not predict the amount of the time required for downloading the Java application. There is a problem, therefore, that when a Java application consists of a plurality of files, use of the terminal may be restricted due to a longer than expected download time. This is extremely serious, especially for terminals such as cellular telephones in which a browser is installed which have a limited communication range or process capability. Necessary property information such as the file name of the Java application and the file size can, of course, be displayed on the Web page in the user's terminal, but there is the concern that some incorrect property information might be notified to the user due to erroneous descriptions or fraudulent intent.

To avoid the above mentioned problems, dividing a Java application into two files, ADF (Application Descriptor File) which contains property information and JAR (Java ARchive) which contains the entity of data, and receiving these in sequence at the terminal is suggested. JAR is a file type in which one or a plurality of files are organized into one. JAR is able to download a plurality of files in one operation, thereby saving the time required to download each file in a separate operation. However, when a file is divided into two files, ADF and JAR, the problem of ensuring security is not taken into account at all.

DISCLOSURE OF INVENTION

The object of the present invention is to provide a data obtaining method and a terminal which can assure sufficiently high security when divided data is obtained.

To achieve the above mentioned objective, the present invention provides a data obtaining method comprising a first receiving step in a terminal which can communicate via a network, for receiving, from the network side, a first data unit in which property information on data is stored; a determining step in the terminal to determine whether the data can be obtained based upon a communication mode which was used in the first receiving step and a communication mode being used for receiving a second data unit in which an entity of the data is stored; and a second receiving step in which the second data unit is received from the network side when a determined outcome in the determining step is "yes", and the second data unit is not received from the network side when a determined outcome in the determining step is "no."

By this data obtaining method, whether the second data unit can be received is determined by comparing the communication mode which was used when the first data unit was received with the communication mode which is used for receiving the second data unit. That is, acquisition of data can be forbidden when the communication mode is inappropriately switched from the time when the first data unit is received to the time when the second data unit is received. In other words, sufficiently high security can be assured when divided data is obtained.

Also, the present invention provides a data obtaining method wherein acquisition of the data is not allowed when security of a communication mode which is used for receiving the second data unit is lower than security of communication mode which was used in the first receiving step in the determining step.

Also, the present invention provides a data obtaining method wherein a communication mode for receiving the first data unit is a mode using encryption communication, and acquisition of the data is not allowed when a communication mode for receiving the second data unit is a mode which does not use encryption in the determining step.

Also, the present invention provides a data obtaining method wherein acquisition of the data is not allowed when a communication mode which was used in the first receiving step and a communication mode used for receiving the second data unit disaccord in the determining step.

Also, the present invention provides a data obtaining method wherein the data is a computer program which can be executed at the terminal.

Also, the present invention, in any of the data obtaining methods described above, provides a data obtaining method wherein the computer program is a computer program which performs communication.

Also, the present invention, in any of the data obtaining methods described above, provides a data obtaining method wherein the terminal is a cellular telephone.

Also, the present invention provides, in a terminal, a first receiving means for receiving a first data unit in which property information on data is stored from a network side; a determining means for determining if acquisition of the data is feasible based upon a communication mode which was used for receiving the first data unit by the first receiving means and a communication mode used for receiving a second data unit in which an entity of the data is stored from the network side; and a second receiving means which receives the second data unit from the network side when a determined outcome by the determining means is "yes", and does not receive the second data unit from the network side when a determined outcome by the determining means is "no."

BEST MODE OF CARRYING OUT THE INVENTION

Hereinafter, the preferred embodiments of the present invention will be explained by referring to the diagrams. The present invention is not restricted to the following embodiments, and various changes are possible without departing from the spirit and the scope of the invention.

[Fundamental Idea]

First, the fundamental idea of the data obtaining method of the present invention will be explained.

Figure 1:
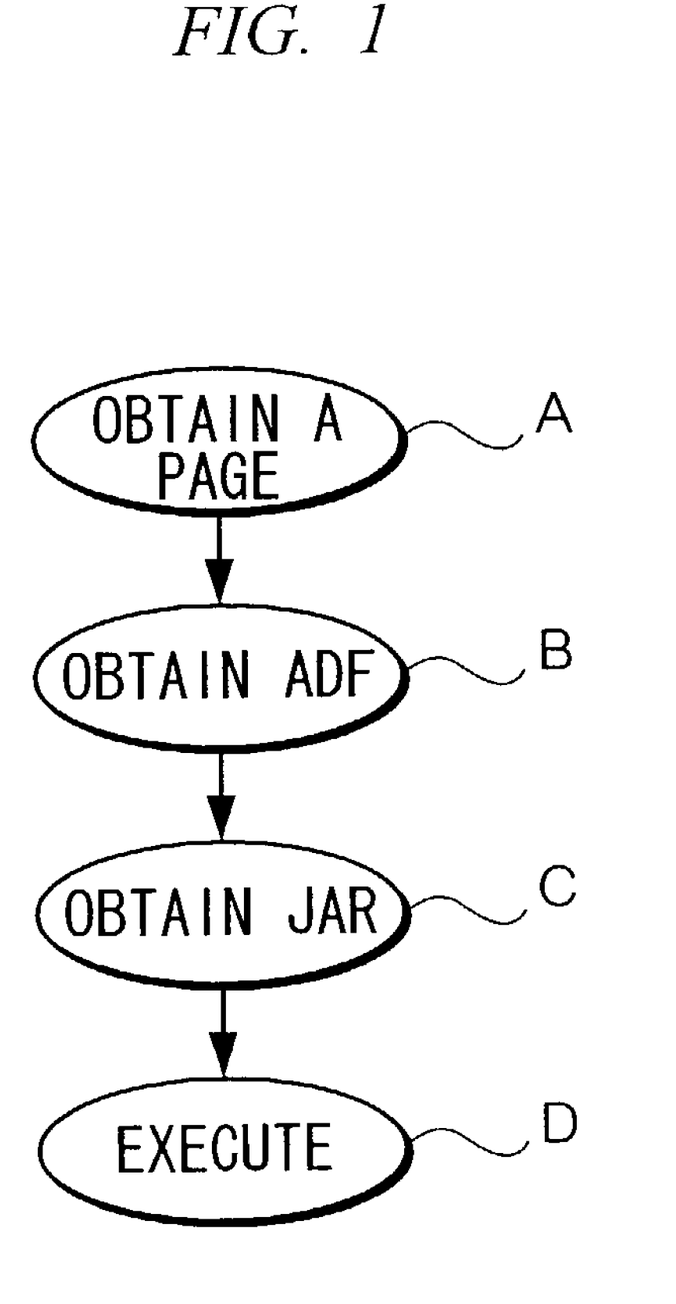
FIG. 1 is a diagram showing the basic process of obtaining a Java application in the terminal in the embodiment of the present invention.

FIG. 1 shows the basic process when the terminal in the present embodiment obtains a Java application. As shown in FIG. 1, during the acquisition and the execution of a Java application, the process in the terminal is performed in the order A, B, C, D. In other words, the terminal first sends out an acquisition request to the network for the page to obtain a Java application, and accesses the relevant page (Step A).

At this state, the terminal user then inputs an order for obtaining the Java application described in this page by operating the terminal, the terminal sends out the acquisition request in response to this order, obtains ADF of the relevant Java application and stores it in fixed memory (Step B). Then the terminal sends out to the network the acquisition request for JAR which corresponds to this ADF, obtains the relevant JAR and stores it in fixed memory (Step C). Then as the terminal user orders the execution of the obtained Java application (the program contained in JAR) by operating the terminal, the relevant Java application is executed at the terminal (Step D).

The basic process is just as described above, but the conditions change according to the communication mode used for reaching each step. For instance, an operation in which the same communication mode is used in Steps A to C is different from an operation in which an ordinary communication mode in which there is no encryption is used in Step A, but thereafter, communication by SSL (Secure Sockets Layer) which is the protocol for sending and receiving information by encrypting is used till Step C. The operation of the terminal which corresponds to such conditions is as follows.

Figure 2:
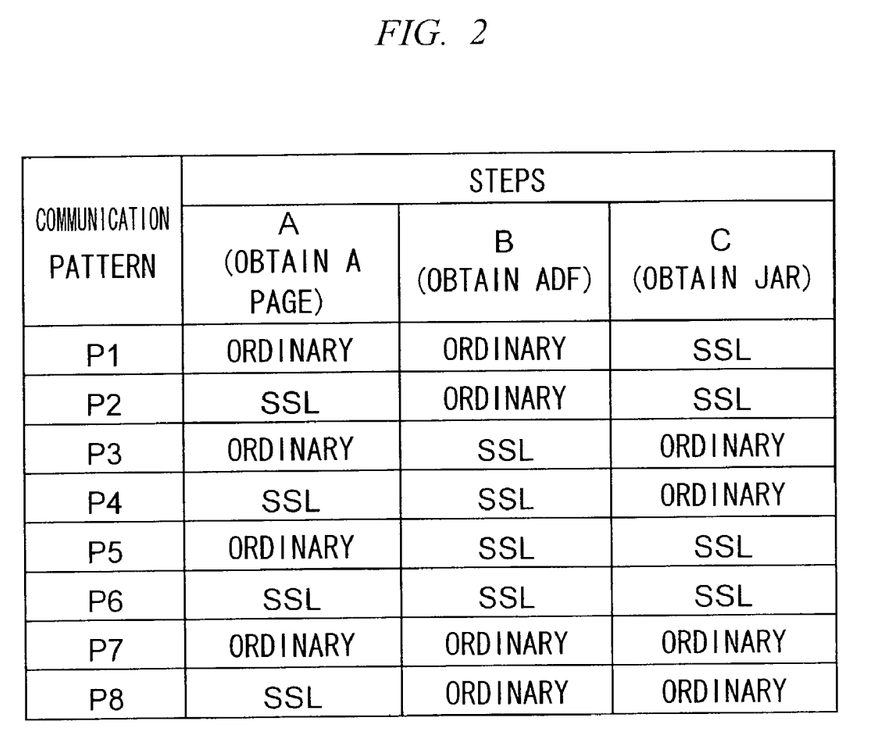
FIG. 2 is a diagram showing the communication patterns of this terminal.

FIG. 2 is a diagram showing the communication patterns of the terminal of the present embodiment, and, as shown in this diagram, the communication patterns P1 to P8 are possible communication patterns of the terminal. The communication patterns P1 to P8 are all the possible variations of the order of each communication mode (ordinary/SSL) of Steps A to C.

Figure 3:
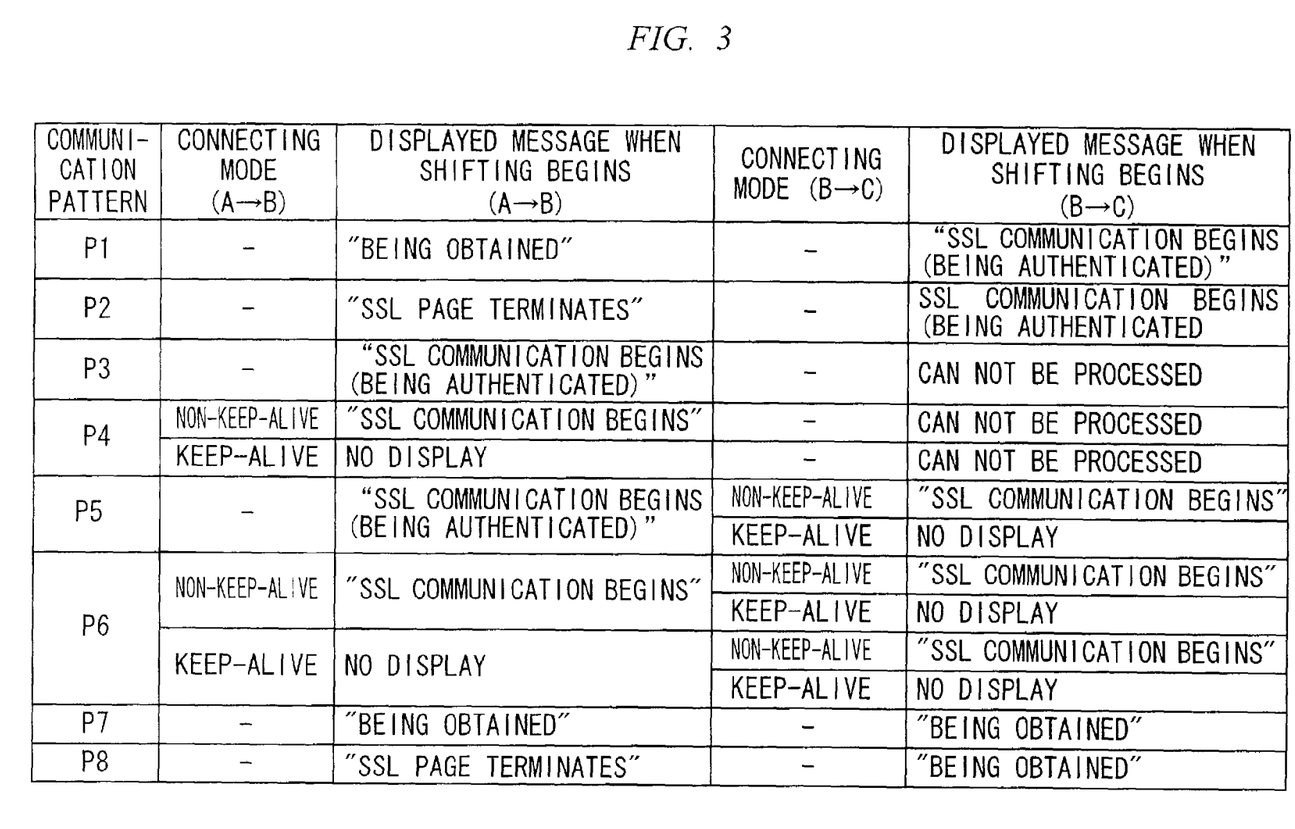
FIG. 3 is a diagram showing the displayed messages in this terminal.

FIG. 3 is a diagram showing the displayed messages in the terminal of the present embodiment. In this diagram, the displayed message of the time when shifting from Step A to Step B begins and the displayed message of the time when shifting from Step B to Step C begins which correspond to communication patterns P1 to P8, are indicated, and the operation of the terminal can be identified from these displayed messages. Also, in this diagram, the connecting modes used when shifting from Step A to Step B and the connecting modes used when shifting from Step B to Step C correspond to each communication pattern, and the displayed messages correspond to the communication patterns and to each connecting mode. However, in some cases, the displayed messages are determined without relying upon the connecting modes, and "-" is indicated in the column of such a connecting mode. The types of connecting modes are keep-alive mode in which a plurality of data can be forwarded by maintaining the connection, and non-keep-alive mode in which the connection is cancelled whenever one data exchange terminates. Non-keep-alive mode is the ordinary data exchange mode of HTTP, and keep-alive mode is the ordinary data exchange mode of HTTPS (Hyper Text Transfer Protocol Security) which corresponds to SSL.

In the present embodiment, the operations shown in diagram 3 are achieved. These operations will be described in detail later. An example of one operation will be explained now for the purpose of explaining the diagram. For instance, according to communication pattern P6 (the communication pattern in which all the communication modes from Step A to C are SSL), while shifting from Step A to Step B when the connection mode is non-keep-alive, the displayed message at the beginning of shifting from Step A to Step B is "SSL communication begins." Also, while shifting from Step B to Step C when the connection mode is keep-alive, there is no display at the beginning.

The most distinctive point in this diagram is that, in communication patterns P3 and P4, shifting from Step B to Step C is not allowed. As shown in FIG. 2, in communication patterns P3 and P4, the communication mode in Step B is SSL, and the communication mode in Step C is ordinary. In other words, in the present embodiment, the acquisition pattern of obtaining ADF by communication using the encrypting communication mode then subsequently obtaining JAR by communication using the ordinary communication mode is not allowed. The reason for this will be explained hereafter.

When a Java application obtained from the network is executed, and the executed Java application performs communication via a network, the mode used when this Java application performs communication via a network is usually the communication mode which was used when the terminal obtained the Java application. For instance, when a Java application obtained by SSL communication is executed, and this Java application performs communication via a network, that communication mode will be limited to SSL. Therefore, at the terminal side, as long as the communication mode was SSL when the Java application was obtained, it can be determined that personal information on the terminal user will not be transmitted in the plain language even when this Java application transmits personal information on the terminal user using the network thereafter.

It is to be noted that, as in the present embodiment, when a Java application is obtained from a network by using ADF and JAR, this Java application performs communication in the same communication mode as when JAR was obtained. In other words, as can be seen in communication patterns P3 and P4, when the communication mode during the acquisition of ADF is SSL, and the communication mode during the acquisition of JAR is ordinary, the Java application contained in this JAR will perform communication in the ordinary communication mode when it performs communication using a network.

However, a user tends to assume that the communication mode for obtaining JAR is SSL if the communication mode for obtaining ADF is SSL. If a difference between the communication mode for obtaining ADF and the communication mode for obtaining JAR is allowed, there is the risk that personal information on the terminal user is transmitted in the plain language contrary to the will of the user. Also, once personal information is transmitted in the plain language contrary to the will of the terminal user, there is the risk that a third person with fraudulent intent and so forth may surreptitiously gain access to personal information on the terminal user. To avoid such problems, shifting from Step B to Step C is not allowed in communication patterns P3 and P4 as shown in FIG. 3. In FIG. 2, the communication mode of Step B and the communication mode of Step C are different even in communication patterns P1 and P2, but these communication patterns are allowed in the present embodiment since the data transmitted by a Java application executed at the terminal is a lot more secure than a user is likely to require.

[Configuration]

Next, the data delivery system by using terminal T in the present embodiment will be explained.

Figure 4:
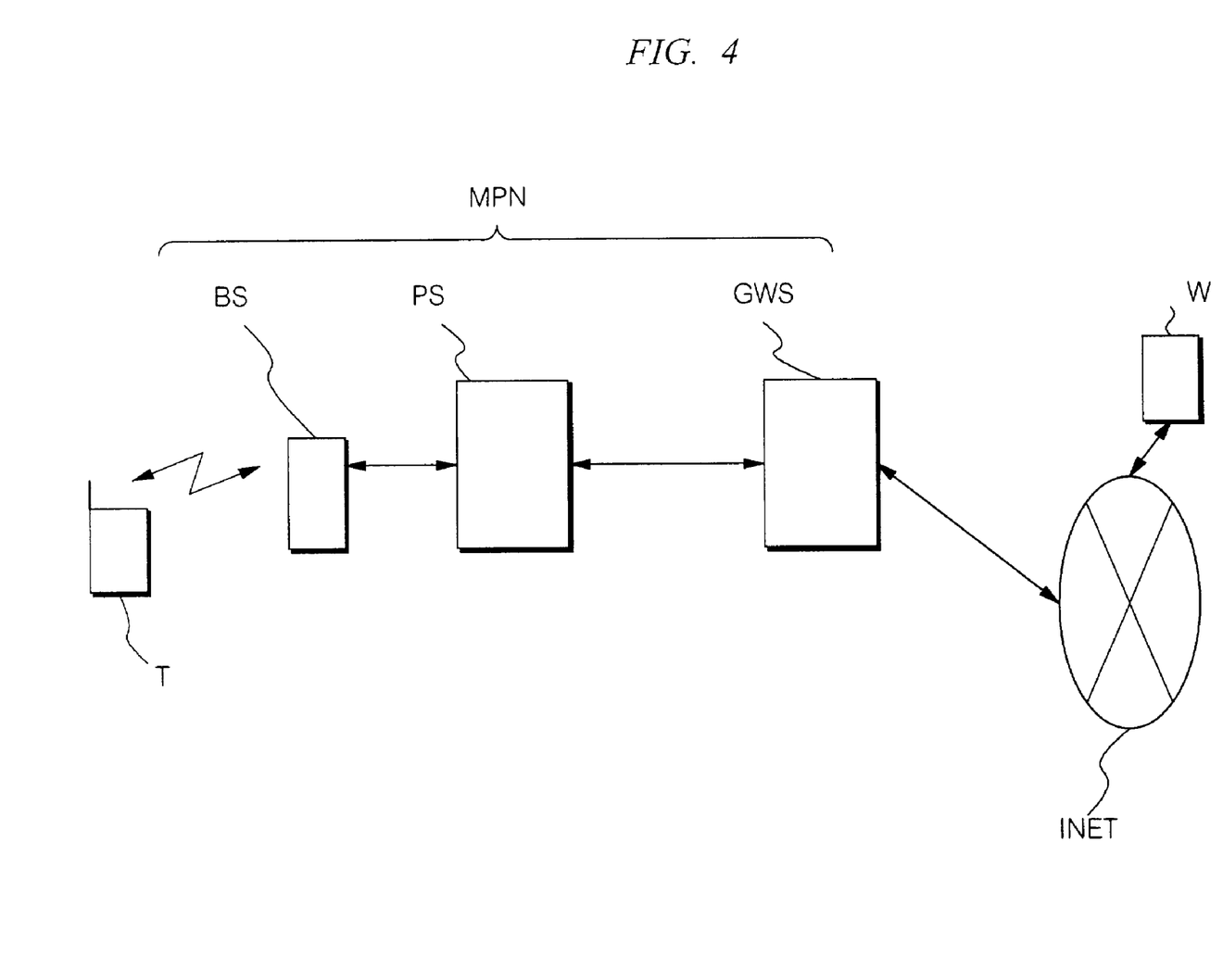
FIG. 4 is a block diagram showing the configuration of the data delivery system using this terminal.

FIG. 4 is a block diagram showing the configuration of the data delivery system by using terminal T, and as shown in this diagram, this data delivery system is the system which allows terminal T to utilize WWW (World Wide Web).

In this diagram, terminal T is a terminal, in this case a cellular telephone, for receiving the packet communication service of mobile packet communication network MPN, which is to be connected remotely to mobile packet communication network MPN and the mobile telephone network (not shown). The mobile telephone network is the network for providing a call service for standard mobile telephones, and terminal T can receive this call service. The detailed functions and configurations of terminal T will be described later.

Mobile packet communication network MPN consists of a plurality of base stations BS, a plurality of packet subscriber processing devices PS, gateway server GWS and communication lines for connecting these.

Base stations BS are placed at, for example, constant intervals, and each base station covers an area with a radius of 500 meters, and performs radio communication with terminal T within its radio zone.

Packet subscriber processing device PS is the computer system which is installed in the packet subscriber switching station for serving a plurality of base stations BS, and it receives packet exchange requests from terminal T and relays the received packets to the addressed terminal T via other packet subscriber processing devices PS and base stations BS.

Gateway server GWS is the computer system which is installed in the mobile packet gateway relaying exchange station for mutually connecting different networks such as mobile packet communication network MPN and Internet INET, and which performs exchanges of communication protocols which are different between the networks. The exchanges of communication protocols in this case specifically are mutual exchanges of transmission protocols for the mobile packet communication network which mobile packet communication network MPN complies with and which transmission protocols Internet INET complies with.

The transmission protocol which Internet INET complies with contains TCP/IP (Transmission Control Protocol/Internet Protocol) of the network layer and the transport layer which is OSI Reference Model, and the protocol of HTTP, HTTPS and so forth which are achieved on this TCP/IP. The protocol which mobile packet communication network MPN complies with contains the protocol in which TCP/IP is simplified (hereafter referred to as TL) and the protocol which is the equivalent of HTTP and HTTPS (hereafter referred to as AL). In other words, terminal T uses WWW on AL.

Also, as gateway server GWS receives HTTP (or HTTPS) message which uses GET method from terminal T, it checks up on URL (Uniform Resource Locator) contained in HTTP (or HTTPS) which uses this GET method. If this URL is the general URL on Internet INET, HTTP (or HTTPS) message which uses this GET method is forwarded to Internet INET, and the response transmitted from Internet INET which corresponds to HTTP (or HTTPS) message which uses this GET method is sent back to this terminal T. If URL contained in HTTP (or HTTPS) which uses GET method is one which indicates the resource location of itself, gateway server GWS sends this resource correlated with HTTP (or HTTPS) message which uses this GET method back to terminal T.

IP server W is the server which is connected to Internet INET and provides various services to clients who use WWW. Specifically, as IP server W receives a request for HTTP (or HTTPS) message which uses GET method via Internet INET, it sends back the resource (the file of works in the present embodiment) which is identified by URL contained in HTTP (or HTTPS) message which uses this GET method. In the present embodiment, the purpose of IP server W is to transmit a Java application, and every communication between IP server W and terminal T is performed by HTTP (and HTTPS) and AL. Also, both IP server W and terminal T support the data exchange mode of keep-alive/non-keep-alive of HTTP (and HTTPS) and SSL of HTTPS.

Next, the configuration of terminal T will be explained. However, in this section, the configuration of key units which directly relate to the present invention will be explained.

Figure 5:
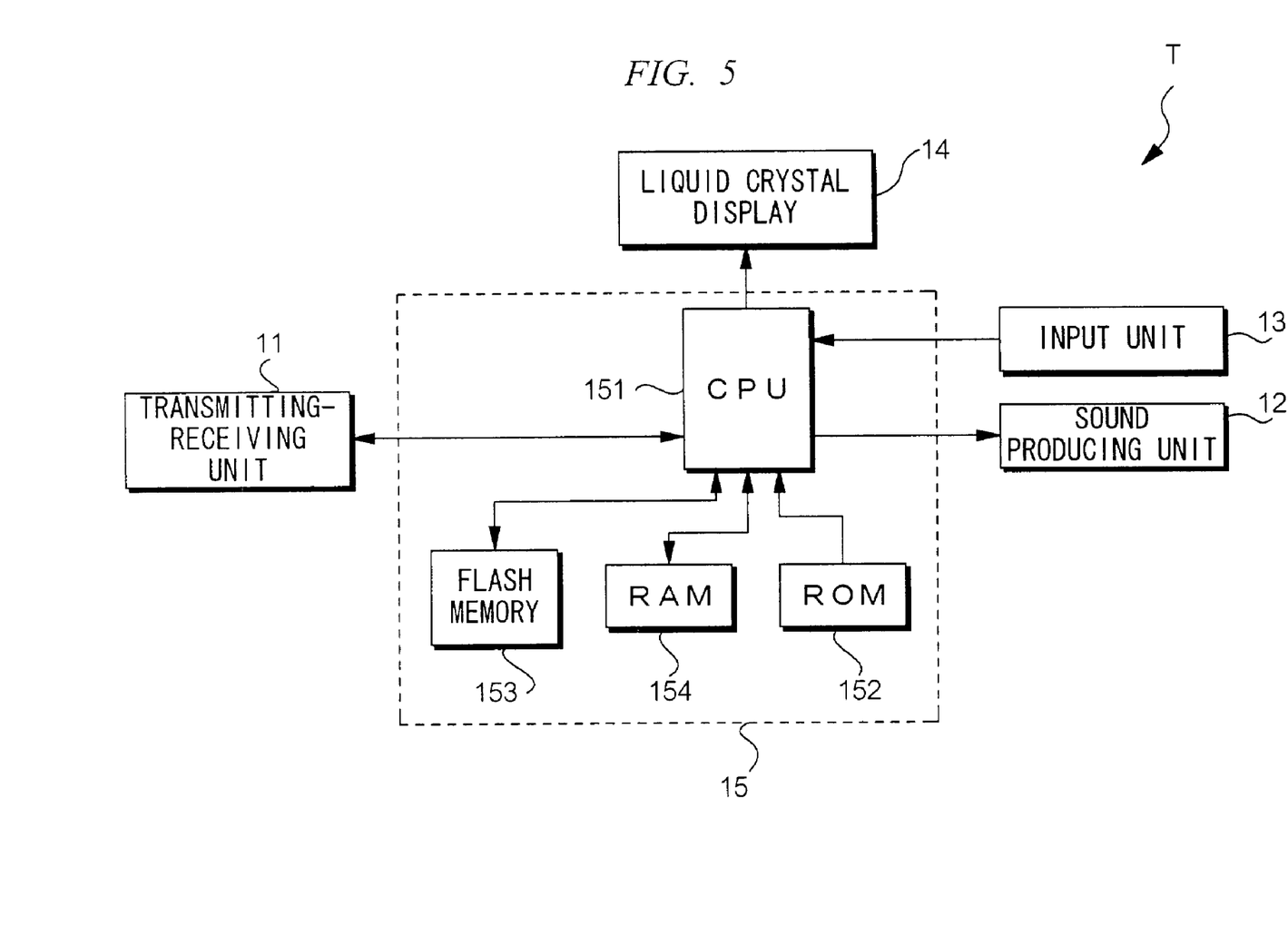
FIG. 5 is a block diagram showing the configuration of the key units of this terminal.

FIG. 5 is a block diagram showing the configuration of key units of terminal T, and as shown in this diagram, terminal T has built-in transmitting-receiving unit 11 (for instance, equipped with an antenna, a radio unit, a transmitter, a receiver and so forth) for performing radio communication with base station BS, sound producing unit 12 (for example, consisting of a sound source, a speaker and so forth) for producing sound, input unit 13 which is equipped with key pads by which input operations such as number input and letter input are performed, liquid crystal display 14 which contains the display domain of a specific size and control unit 15 which controls each of these units.

Control unit 15 has built-in CPU 151 which performs each control operation, the browser which is executed by CPU 151, the software for carrying out Java Virtual Machine, such software as the control program of terminal T, information necessary for connecting to gateway server GWS, process table PT1 which will be described later, ROM (Read Only Memory)152 in which PT2 and so forth are stored, flash memory 153 in which received data, the set-up content of the user (for example, the capability of automatic acquisition of JAR) and so forth are stored to allow them to be used again even after the terminal is restarted, and RAM 154 which is stored to prohibit received data from being used again after the terminal is restarted and which is to be used as the working memory of CPU 151.

As the power switch (not shown) is turned on, CPU 151 reads out and executes the control program stored in ROM 152, then controls ROM 152, flash memory 153, RAM 154, each of units 11 to 13 and liquid crystal display 14 in compliance with commands of the user inputted from the control program and input unit 13. Also, CPU 151, in compliance with the command inputted from input unit 13, activates the browser and is capable of performing communication on this browser in compliance with the command from input unit 13. Furthermore, CPU 151 is capable of controlling the communication process based upon process tables PT 1 and PT 2 (refer to FIG. 6) stored in ROM 152. Specific operations by this function will be described later.

Also, CPU 151 activates Java Virtual Machine when it executes a Java application stored in flash memory 153 and executes this Java application on this Java Virtual Machine. Furthermore, CPU 151 activates Java Virtual Machine and the browser when it accesses a Java application (Java applet) stored in RAM 154, and executes this Java application on Java Virtual Machine and the browser.

Acquisition of data by terminal T is performed first, by obtaining HTML data from the home URL (the resource location on gateway GWS which it should access first) stored in ROM 152 by CPU 151 which accesses the browser stored in ROM 152 and executes this browser. Then, based upon this data, liquid crystal display 15 prompts the display of the dialogue screen, and data is obtained when the user operates input unit 13 after the display of this dialogue screen.

[Java Application Obtaining Operation]

Figure 6:
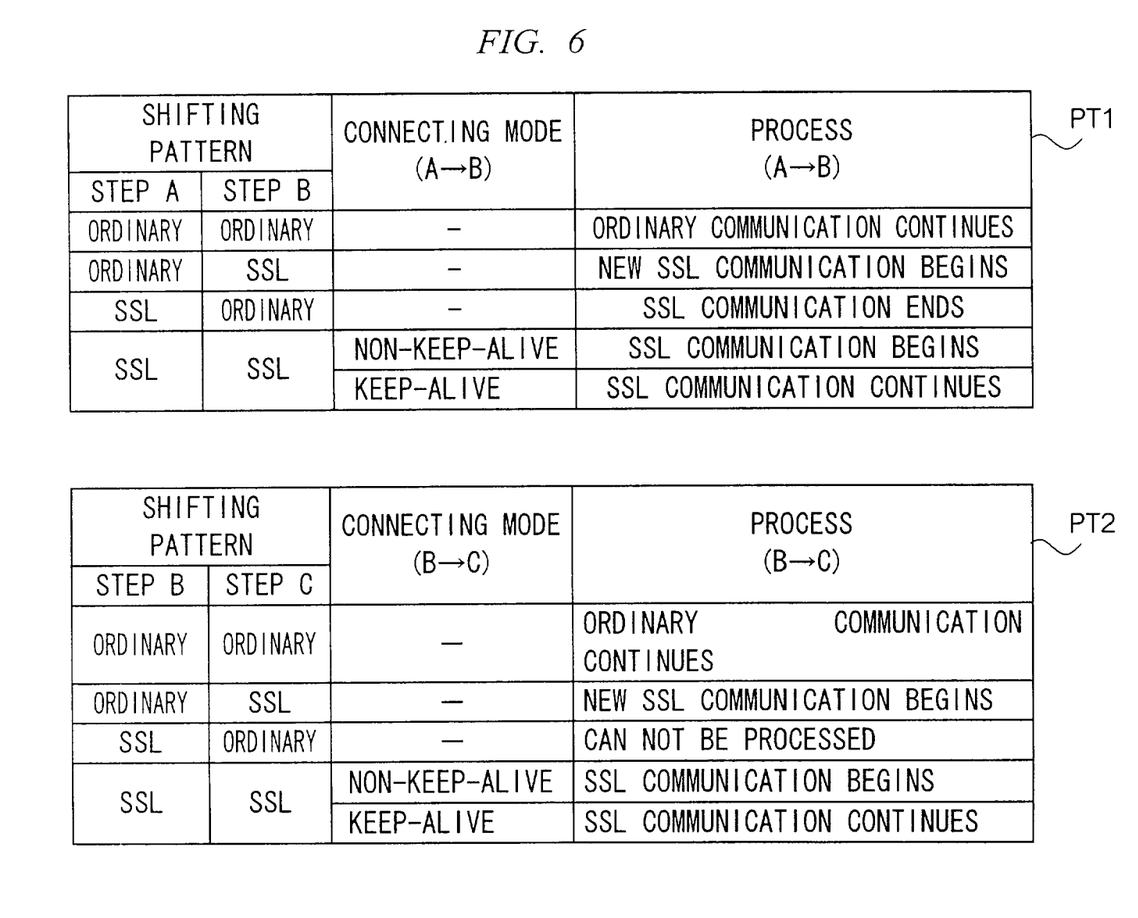
FIG. 6 is a conceptual diagram showing the configuration of process tables PT1 and PT2 within this terminal.
Figure 7:
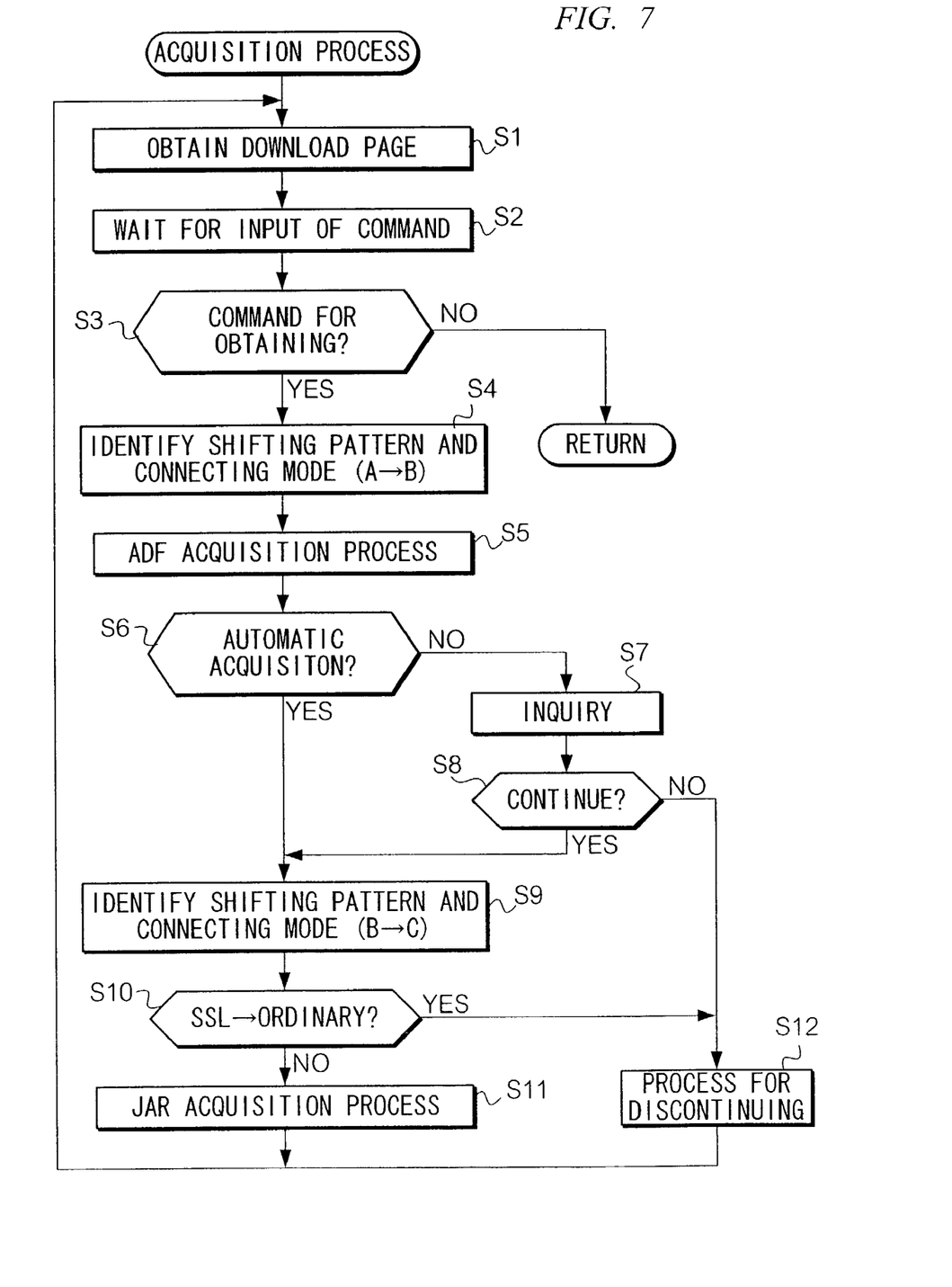
FIG. 7 is a flowchart showing the process performed by this terminal during the acquisition of a Java application.

FIG. 7 is a flowchart showing the flow of the process which terminal T performs when a Java application is obtained, and hereafter, by referring mainly to FIG. 2, FIG. 3, FIG. 6 and FIG. 7, the operations of terminal T for obtaining a Java application from IP server W will be explained according to each communication pattern. However, in the explanations below, the operations which overlap are omitted as much as possible. At terminal T, it is assumed that the browser has already been activated. Also, with regard to the acquisition embodiment of the Java application which is the object of the acquisition, it can be stored in either fixed memory or temporary memory, but only the case in which a Java application is stored in fixed memory after its acquisition will be explained to avoid complicating the explanation.

(1) Case of Communication Pattern P1

As shown in FIG. 2, the communication modes of communication pattern P1 are in ordinary mode in Step A and Step B, and in SSL in Step C.

First, terminal T obtains the page (hereafter, referred to as download page) for obtaining the Java application which is its object (Step S1). Specifically, CPU 151 of terminal T (refer to FIG. 5) controls transmitting-receiving unit 11 based upon the command of the user inputted from input unit 13, and sends IP server W HTTP message by GET method which is the compliance of transmitting-receiving unit 11 to this command (refer to FIG. 4). In response, HTML data of the download page which is the object is sent back from IP server W. This HTML data is received by transmitting-receiving unit 11 and is transferred to CPU 151 from transmitting-receiving unit 11. CPU 151 stores this HTML data in RAM 154 and provides the user interface by further interpreting and executing this data. As a result, the display by this user interface appears in liquid crystal display 14.

Then terminal T waits for an input of a command by the user (Step S2), and the acquisition process terminates if the command inputted is not the command for obtaining the object Java application (Step S3). Specifically, CPU 151 of terminal T identifies the content of the command by the user based upon the command inputted from input unit 13 and the current user interface, and the acquisition process terminates if commands which are different from the content of obtaining the Java application, such as obtaining a different page, is inputted, or the power switch (not shown) is shut off.

On the other hand, if the command inputted in Step S2 is the request for obtaining the object Java application (Step S3), by HTML data obtained in Step S1, the shifting pattern from Step A to Step B and the connecting mode are identified (Step S4). Then the process which corresponds to the identified result is executed, and ADF which is the object is obtained (Step S5). In this case, the communication modes of both Step A and B are ordinary; therefore, in compliance with process table PT1 shown in FIG. 6, the process for obtaining ADF by ordinary communication is performed. During this process, "Being Obtained" is displayed in liquid crystal display 14. As shown in process table PT1 in FIG. 6, the processing content is determined whatever the connecting mode is in this case. Also, the communication mode in Step B is not determined by the user, but in Step S4, it is revealed by referring to the URL which is contained in HTML data obtained in Step S1 for obtaining ADF.

Specifically, the beginning of the URL displays the communication mode for accessing WWW server, and when the URL begins with "http", the communication mode will be "ordinary" since HTTP is displayed. If the URL begins with "https", the communication mode will be "SSL" since HTTPS is displayed.

As the acquisition of ADF is completed, and if the automatic acquisition of JAR is not allowed (Step S6), terminal T proceeds to ask the user whether JAR should be obtained (Step S7). When the command for continuing the acquisition of JAR is inputted as the response to this inquiry (Step S8), it proceeds to the process of Step S9. However, when the command for discontinuing the acquisition of JAR is inputted, the discontinuing process is performed (Step S12), and the process goes back to Step S1. Also, if the automatic acquisition of JAR is allowed (Step S6), the process immediately proceeds to Step S9.

Terminal T is equipped with the function for setting allow/disallow for the automatic acquisition of JAR. CPU 151 sets/resets the designated bit of flash memory 153 which is the bit for setting allow/disallow of the automatic acquisition of JAR in response to the command inputted from input unit 13. Therefore, by referring to this bit, CPU 151 can identify the allow/disallow setting for the automatic acquisition of JAR. Also, in the discontinuing process in Step S12, CPU 151 discontinues the process for obtaining the Java application, discards ADF which is the object and is stored in flash memory 153, and takes maximum advantage of the memory volume of flash memory 153.

Next, the shifting pattern from Step B to Step C and the connecting mode are identified, and the acquisition process of JAR is performed based upon the identified result (Step S10, S11). In this case, the communication mode of Step B is ordinary, and the communication mode of Step C is SSL; therefore, as shown in process table PT2, the process will be the one in which JAR is obtained by newly starting SSL communication. During this process, "SSL Communication Begins (Being Authenticated)" is displayed in liquid crystal display 14 as the display message. Thus, the process which corresponds to shifting pattern P1 in FIG. 3 is properly performed. As shown in process table PT2 in FIG. 6, the process content is determined whatever the connecting mode is in this case. Also, the communication mode of Step C will be revealed in Step S9 by referring to the URL which is contained in the ADF file obtained in Step S5 for obtaining JAR. As ADF is obtained, if the URL begins with "http", the communication mode will be "ordinary." If the URL begins with "https", the communication mode will be "SSL."

(2) Case of Communication Pattern P2

As shown in FIG. 2, the communication modes of communication pattern P2 are ordinary in Step B, and SSL in Step A and C.

First, in Steps 1 to 5, the same process as in communication pattern P1 is performed. However, since the communication mode in Step A is SSL, HTTPS of GET method is transmitted to IP server W in Step S1. Also, the communication mode is SSL in Step A, and the communication mode is ordinary in Step B during this process; therefore, as shown in process table PT1 shown in FIG. 6, SSL communication will be stopped, and the process for obtaining ADF by ordinary communication will be performed. During this process, "SSL Page Terminates" is displayed in liquid crystal display 14 as the display message.

Also, after Step S9, the communication mode in Step B is ordinary, and the communication mode in Step C is SSL; therefore, the same process as communication pattern P1 will be performed. Thus, the process which corresponds to communication pattern P2 in FIG. 3 is properly performed.

(3) Case of Communication Pattern P3

As shown in FIG. 2, the communication modes of communication pattern P3 are ordinary in Steps A and C, and SSL in Step B.

First, in Steps S1 to S5, the same process as communication pattern P1 is performed. However, during this process, the communication mode of Step A is ordinary, and the communication mode of Step B is SSL; therefore, as shown in process table PT1 shown in FIG. 6, the process will be the one for obtaining ADF by newly starting SSL communication. During this process, "SSL Communication Begins (Being Authenticated)" is displayed in liquid crystal display 14 as the display message. Even if the connecting mode is keep-alive, SSL communication newly starts in this process despite the connecting mode since switching to SSL communication mode from the ordinary communication mode without terminating the process is impossible.

Next, the shifting pattern from Step B to Step C and the connecting mode are identified (Step S9). During this process, the communication mode in Step B is SSL, and the communication mode in Step C is ordinary; therefore, the determined result in Step S10 will be "yes", and the process goes back to Step S1 via the discontinuing process in Step S12. In other words, the object Java application is not obtained, and the process which corresponds to communication pattern P3 in FIG. 3 is properly performed.

(4) Case of Communication Pattern P4

As shown in FIG. 2, the communication modes of communication pattern P4 are ordinary in Step C, and SSL in Steps A and B.

First, in Steps SI to S5, the same process as communication pattern P1 is performed. However, since the communication mode in Step A is SSL, HTTPS message of GET method is transmitted to IP server W in Step S1. Also, in this process, the communication mode in Steps A and B is SSL; therefore, the process in compliance with the connecting mode from Steps A to Step B is performed. In other words, if the connecting mode is non-keep-alive, the process for obtaining ADF by starting SSL communication is performed. If the connecting mode is keep-alive, the process for obtaining ADF by continuing SSL communication is performed. In the former case. "SSL Communication Begins" is displayed in liquid crystal display 14, and in the latter case, no message is displayed in liquid crystal display 14. A message is not displayed when the connecting mode is keep-alive because a new process of SSL communication does not start.

Also, the communication mode of Step B is SSL, and the communication mode of Step C is ordinary, therefore, the same process as communication pattern P3 is performed. Thus, the process which corresponds to communication pattern P4 in FIG. 3 is properly performed.

(5) Case of Communication Pattern P5

As shown in FIG. 2, the communication modes of communication pattern P5 are ordinary in Step A, and SSL in Step B and C.

First, in Steps S1 to S5, the same process as communication pattern P3 is performed. Then, in the process after Step S9, since the communication mode is SSL in Step B and C, the process in compliance with the connecting mode from Step B to Step C is performed based upon the process in table PT2 shown in FIG. 6. In other words, the process of obtaining JAR is performed by starting SSL communication when the connecting mode is non-keep-alive, and the process of obtaining JAR by continuing SSL communication is performed when the connecting mode is keep-alive. In the former case, "SSL Communication Begins" is displayed in liquid crystal display 14, and in the latter case, no message is displayed in liquid crystal display 14. Thus, the process which corresponds to communication pattern P5 in FIG. 3 is properly performed.

(6) Case of Communication Pattern P6

As shown in FIG. 2, the communication mode of communication pattern P6 is SSL in Steps A, B and C.

First, in Steps S I to S5, the same process as communication pattern P4 is performed. Then in the process after Step S9, the same process as communication pattern P5 is performed. Thus, the process which corresponds to communication pattern P6 in FIG. 3 is properly performed.

(7) Case of Communication Pattern P7

As shown in FIG. 2, the communication mode of communication pattern P7 is ordinary in Step A, B and C.

First, in Step SI to S5, the same process as communication pattern P1 is performed. Then, in the process of Step S9 and thereafter, the process of obtaining JAR by continuing ordinary communication in accordance with process table PT2 shown in FIG. 6 is performed since the communication mode of Steps B and C is ordinary. During this process, "Being Obtained" is displayed in liquid crystal display 14 as the displayed message. Thus, the process which corresponds to communication pattern P7 in FIG. 3 is properly performed.

(8) Case of Communication Pattern P8

As shown in FIG. 2, the communication modes of communication pattern P8 are SSL in Step A and ordinary in Steps B and C.

First, in Steps SI to S5, the same communication pattern as P2 is performed. Then, in the process of Step S9 and thereafter, the same communication pattern as P7 is performed. Thus, the process which corresponds to communication pattern P8 in FIG. 3 is properly performed.

[Supplement]

As explained above, according to the present embodiment, the process which corresponds to every communication pattern shown in FIG. 2 and FIG. 3 is properly performed, and ADF is obtained by communication in the encrypting communication mode. Then the pattern of acquiring a Java application by obtaining JAR by communication in ordinary communication pattern can be eliminated.

Hence, when the terminal user executes the obtained Java application and, the obtained Java application performs communication by using the network, transmission of personal information in the plain language by Java application, contrary to the will of the terminal user, can be prevented.

Also, as in the above mentioned embodiment, a cellular telephone is effective as a terminal. The data processing ability of a cellular telephone is lower compared to a terminal such as a notebook computer, and the bandwidth of the communication path is narrow when compared to cable communication; therefore, the possibility for the operation of the terminal to be restricted for a longer period of time than the user expects is higher in prior arts. Yet in the present embodiment, such a restriction is avoided by allowing a Java application to be obtained by dividing it into ADF and JAR, and by allowing the user who referred to property information on ADF to determine whether to obtain JAR.

In the above mentioned embodiment, the example of allowing a Java application to be used without obtaining the Java application again even after the terminal was restarted, by storing the obtained Java application into fixed memory, was shown; however, obtaining the Java application again after the terminal is turned on, by storing the obtained Java application into temporary memory, is feasible as well.

Also, in the above mentioned embodiment, a Java application is just one example of data which can be obtained, but other programs or data can also be obtained. In other words, the present invention can be applied when a kind of data which is divided into two units is obtained from the Internet.

Also, in the above mentioned embodiment, communication patterns P1 and P2 in FIG. 2 are allowed, but these can be forbidden. In other words, forbidding an acquisition pattern in which the communication system of Step B and the communication system of Step C disaccord is possible.

Also, in the above mentioned embodiment, a cellular telephone is an example of a terminal, but in the present invention other terminals which can perform communication via a network by cable or air can be used.

Also, in the above mentioned embodiment, communication patterns P3 and P4 in FIG. 2 are, without exception, not allowed, but such limitations do not apply to the present invention. For instance, by asking the user whether acquisition is possible when communication patterns are P3 and P4 in FIG. 2, JAR can be received and stored when the user approves. Otherwise by allowing a type of Java application to be stored in ADF, JAR can be received and stored even if the communication patterns are P3 and P4 in FIG. 2 if the Java application is of the type which does not perform communication.

Also, in the above mentioned embodiment, examples of forwarding data by using HTTP (and HTTPS) and AL are shown, but in the present invention, any protocol which can achieve encryption communication can be adopted. It can, of course, be any communication protocol which corresponds to keep-alive and non-keep-alive. It can also be a communication protocol which does not correspond to these.

Also, in the above mentioned embodiment, an example of converting a communication protocol at gateway server GWS is shown, but this is only one example. For instance, by allowing HTTP (and HTTPS) and SSL to be processed at the terminal, communication can be directly carried out between the terminal and IP server, or it can be carried out after going through a plurality of conversions.

The invention claimed is:

1. A method for receiving an application by a terminal adapted to communicate via a network, the application comprising at least a first portion and a second portion, wherein the first portion comprises a file describing the application and the second portion comprises an entity of data for the application, the method comprising:

accessing via the network to receive the application;

implementing a first communication mode to receive the first portion of the application via the network, wherein the first communication mode is configured to support a first security level of communication;

identifying a second communication mode implementable to receive the second portion of the application via the network, wherein the second communication mode is configured to support a second security level of communication;

determining whether the second security level of the second communication mode is at least as secure as the first security level of the first communication mode: and implementing the second communication mode to receive the second part of the application only if the second security level of the second communication mode is at least as secure as the first security level of the first communication mode.

2. A method of claim 1, wherein the terminal comprises a mobile telephone.

3. A method of claim 1, wherein accessing to receive the application comprises designating the first communication mode.

4. A method of claim 1, wherein identifying a second communication mode comprises identifying a designation of the second communication mode contained in the first portion.

5. A method of claim 1, wherein the second communication mode is the first communication mode.

6. A method for receiving an application by a terminal adapted to communicate via a network, the application comprising at least a first portion and a second portion, wherein the first portion comprises a file describing the application and the second portion comprises an entity of data for the application, the method comprising:
   accessing via the network to receive the application;
   implementing a first communication mode to receive the first portion of the application via the network, wherein the first communication mode is configured to support a first security level of communication;
   identifying a second communication mode implementable to receive the second portion of the application via the network, wherein the second communication mode is configured to support a second security level of communication;
   implementing the second communication mode to receive the second portion of the application via the network;
   determining whether the second security level of the second communication mode is at least as secure as the first security level of the first communication mode; and
   executing the received application only if the second security level of the second communication mode is at least as secure as the first security level of the first communication mode.

7. A method of claim 6, wherein executing the application comprises implementing a third communication mode for communication, wherein the third communication mode is configured to support a third security level of communication which is at least as secure as the second security level of the second communication mode.

8. A method of claim 6, wherein the terminal comprises a mobile telephone.

9. A method of claim 6, wherein accessing to receive the application comprises designating the first communication mode.

10. A method of claim 6, wherein identifying a second communication mode comprises identifying a designation of the second communication mode contained in the first portion.

11. A method of claim 6, wherein the second communication mode is the first communication mode.

12. A terminal for receiving an application comprising at least a first portion and a second portion, wherein the first portion comprises a file describing the application and the second portion comprises an entity of data for the application, the terminal being adapted to communicate via a network, the terminal comprising:
   network access control operable to access via the network to receive the application;
   first communication control operable to implement a first communication mode to receive the first portion of the application via the network, wherein the first communication mode is configured to support a first security level of communication;
   communication mode identifier operable to identify a second communication mode implementable to receive the second portion of the application via the network, wherein the second communication mode is configured to support a second security level of communication;
   security level comparator operable to determine whether the second security level of the second communication mode is at least as secure as the first security level of the first communication mode, and
   second communication control operable to implement the second communication mode to receive the second part only if the second security level of the second communication mode is at least as secure as the first security level of the first communication mode.

13. A terminal of claim 12, wherein the terminal comprises a mobile telephone.

14. A terminal of claim 12, wherein when accessing to receive the application, the network access control designates the first communication mode.

15. A terminal of claim 12, wherein when the communication mode identifier identifies the second communication mode based on a designation of the second communication mode contained in the first portion.

16. A terminal of claim 12, wherein the second communication mode is the first communication mode.

17. A terminal for receiving an application comprising at least a first portion and a second portion, wherein the first portion comprises a file describing the application and the second portion comprises an entity of data for the application, the terminal being adapted to communicate via a network, the terminal comprising:
   network access control operable to access via the network to receive the application;
   first communication control operable to implement a first communication mode to receive the first portion of the application via the network, wherein the first communication mode is configured to support a first security level of communication;
   communication mode identifier operable to identify a second communication mode implementable to receive the second portion of the application via the network, wherein the second communication mode is configured to support a second security level of communication;
   second communication control operable to implement the second communication mode to receive the second portion of the application; and
   security level comparator operable to determine whether the second security level of the second communication mode is at least as secure as the first security level of the first communication mode, and
   application control operable to execute the received application only if the second security level of the second communication mode is at least as secure as the first security level of the first communication mode.

18. A terminal of claim 17, wherein the application control comprises a third communication control operable to implement a third communication mode for communication, wherein the third communication mode is configured to support a third security level of communication which is at least as secure as the second security level of the second communication mode.

19. A terminal of claim 17, wherein the terminal comprises a mobile telephone.

20. A terminal of claim 17, wherein when accessing to receive the application, the network access control designates the first communication mode.

21. A terminal of claim 17, wherein when the communication mode identifier identifies the second communication mode based on a designation of the second communication mode contained in the first portion.

22. A terminal of claim 17, wherein the second communication mode is the first communication mode.

* * * * *